United States Patent
Frost et al.

(10) Patent No.: US 7,070,653 B2
(45) Date of Patent: Jul. 4, 2006

(54) METHOD OF PROVIDING A FIRE BARRIER AND ARTICLE THEREFOR

(75) Inventors: George W. Frost, Afton, MN (US); George F. Vesley, Hudson, WI (US); Biing-Huel D. Su, Woodbury, MN (US); Brandon L. Cordts, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 497 days.

(21) Appl. No.: 10/066,823

(22) Filed: Feb. 4, 2002

(65) Prior Publication Data
US 2002/0113143 A1    Aug. 22, 2002

Related U.S. Application Data

(62) Division of application No. 09/517,803, filed on Mar. 2, 2000, now Pat. No. 6,368,670.

(51) Int. Cl.
B05C 5/00 (2006.01)
B05B 7/32 (2006.01)

(52) U.S. Cl. .................. 118/300; 222/402.13; 239/337

(58) Field of Classification Search ............... 118/300; 222/402.1, 402.13; 239/337, 338; 149/2, 149/19.3; 516/1
See application file for complete search history.

(56) References Cited

U.S. PATENT DOCUMENTS

| | | | | |
|---|---|---|---|---|
| 4,025,672 A | | 5/1977 | Hossenfelder | 427/388 |
| 4,205,150 A | | 5/1980 | Marubashi | 526/252 |
| 4,401,271 A | * | 8/1983 | Hansen | 239/337 |
| RE32,131 E | | 4/1986 | Stahl | 428/215 |
| 4,663,226 A | | 5/1987 | Vajs et al. | 428/305 |
| 4,858,535 A | | 8/1989 | Bechu et al. | 105/15 |
| 4,945,015 A | | 7/1990 | Milner et al. | 523/179 |
| 4,968,556 A | | 11/1990 | Jain | 428/290 |
| 5,006,564 A | | 4/1991 | Noonenbruch et al. | 521/54 |
| 5,444,112 A | | 8/1995 | Carnahan | 524/272 |
| 5,645,627 A | | 7/1997 | Lifshutz et al. | 96/15 |
| 5,744,199 A | | 4/1998 | Joffre et al. | 427/389 |
| 5,830,319 A | | 11/1998 | Ladin | 162/159 |
| 5,968,615 A | | 10/1999 | Schlappa | 428/34.1 |
| 5,974,750 A | | 11/1999 | Landin et al. | 52/396.01 |

OTHER PUBLICATIONS

ASTM E1399-97 Standard Test Method for Cyclic Movement and Measuring the Minimum and Maximum Joint Widths of Architectural Joint Systems (1997) (pp. 501-505).
Firedam™ Spray MSDS (1996) (pp. 98-102).
Standard for Safety UL 2079 Tests for Fire Resistance of Building Joint Systems (1994) (21 pages).
UL Fire Resistance Directory System No. HWD0020 (1999) (2 pages).
UL Fire Resistance Directory System No. FFD0002 (1 page).
International Search Report for Patent Application No. PCT/US 00/17407 (7 pages).

* cited by examiner

*Primary Examiner*—Chris Fiorilla
*Assistant Examiner*—Yewebdar Tadesse
(74) *Attorney, Agent, or Firm*—David B. Patchett

(57) ABSTRACT

A method of providing a fire barrier that includes coating an opening in a structure with a composition that includes an elastomer. The composition is substantially free of volatile organic compounds and, when dry, exhibits a tensile strength of from about 300 psi to about 1500 psi, at least about 600% elongation, a modulus of from about 200 psi to about 600 psi, and a tensile toughness of greater than 10 in-lb.

41 Claims, No Drawings

METHOD OF PROVIDING A FIRE BARRIER AND ARTICLE THEREFOR

CROSS-REFERENCE TO RELATED APPLICATIONS

This application is a division of U.S. patent application Ser. No. 09/517,803, filed Mar. 2, 2000, now U.S. Pat. No. 6,368,670.

The invention relates to providing a fire barrier.

Building codes for commercial buildings generally require fire barriers that prevent the combustion products of fire, e.g., heat, smoke and gases, from passing through building joints into adjoining areas. Joints in buildings, e.g., joints between walls, floors, walls and floors, perimeter joints and joints at the head of a wall (i.e., between a wall and a ceiling), include two structures that meet to define an opening. The opening can potentially provide a source of oxygen for a fire. Therefore, joint openings are usually filled with a fire retardant material, e.g., insulation or mineral wool, to provide a "fire dam," and then sealed, e.g., with a caulk, putty or a sprayable coating, to provide a fire barrier.

The sealant applied to the joint is often flexible to accommodate joint movement due to building movement that may occur due to various forces including, e.g., loads, heat, wind and seismic factors. Such joints are often referred to as "dynamic joints." Dynamic joints are generally linear openings in a building designed to allow for building movement. Examples of dynamic joints include joints within floors or walls, and joints between floors and walls. Dynamic joints are often referred to in the trade as "construction joints," "soft joints," "expansion joints," and "seismic joints." A fire barrier for a dynamic joint generally needs to retain its resiliency over an extended period of time under dynamic conditions. During a fire condition, the joint is likely to be subject to even greater movement, thereby making it necessary that the fire barrier retain its integrity and prevent the migration of flame and smoke under such conditions.

SUMMARY

In one aspect, the invention features a method of providing a fire barrier, where the method includes coating an opening in a structure with a composition that includes an elastomer, the composition being substantially free of volatile organic compounds and, when dry, exhibiting a tensile strength of from about 300 psi to about 1500 psi, at least about 600% elongation, a modulus of from about 200 psi to about 600 psi, and a tensile toughness of greater than 10 in-lb. In one embodiment, the method further includes spraying the composition on the structure and across the opening. In another embodiment, the method further includes propelling the composition from an aerosol container onto the structure and across the opening.

In other embodiments, the structure includes a joint that includes a first substrate and a second substrate, the opening being disposed between the first substrate and the second substrate. In some embodiments, the structure further includes a fire retardant component disposed within the opening.

In other embodiments, the method provides a fire barrier capable of passing at least one of Fire Test No. 1, Fire Test No. 2, and Fire Test No. 3. In some embodiments, the composition is capable of passing at least one test selected from the group consisting of Fire Test No. 1, Fire Test No. 2 and Fire Test No. 3, when installed in the fire rated construction of the test.

In another aspect, the invention features a method of providing a fire barrier that includes coating an opening in a structure with a composition that includes a carboxylated elastomer, the composition being water reducible and, when dry, exhibiting a toughness of at least about 20 in-lb. In one embodiment the composition, when dry, exhibits at least about 600% elongation. In other embodiments, the composition, when dry, exhibits from at least about 700% elongation. In some embodiments, the composition, when dry, exhibits a tensile strength of from about 300 psi to about 1500 psi. In another embodiment, the composition, when dry, exhibits a toughness of at least about 30 in-lb. In one embodiment, the elastomer is selected from the group consisting of polychloroprene, styrene butadiene rubber and mixtures thereof. In some embodiments, the composition is substantially free of volatile organic compounds.

In other aspects, the invention features a method of providing a fire barrier that includes coating an opening in a structure with a composition that includes a carboxylated elastomer, the composition being water reducible and, when dry, exhibiting a modulus of from about 200 psi to about 600 psi and a toughness of greater than 10 in-lb. In one embodiment, the composition exhibits a modulus of from about 200 psi to about 300 psi. In other embodiments, the composition, when dry, exhibits a toughness of at least about 30 in-lb.

In another aspect, the invention features a method of providing a fire barrier that includes coating an opening in a structure with a composition that includes a carboxylated elastomer, the composition being water reducible and, when dry, exhibiting a tensile strength of from about 300 psi to about 1500 psi and a toughness of greater than 10 in-lb. In one embodiment, the composition exhibits a modulus of from about 200 psi to about 600 psi. In other embodiments, the composition, when dry, exhibits a toughness of at least about 30 in-lb.

In other aspects, the invention features a device capable of spraying a composition, the device includes a chamber and an above-described composition.

In another aspect, the invention features an aerosol container according to an above-described device, wherein the container further includes a propellant, e.g., a fluorocarbon.

The composition is well suited for sealing joints in buildings. The composition, after drying, provides a good barrier to combustion products such as smoke, heat and gases. The dried composition also exhibits good resistance to a fire hose stream of water. The dried composition is also sufficiently flexible so as to maintain a seal around a joint that experiences movement, i.e., a dynamic joint. The composition is also water reducible, i.e., dispersible in water without visible coagulation or stringing, and can be washed away with tap water, which affords easy cleanup to the user. In addition, the composition can be formulated to be sprayable, e.g., from a pressurized aerosol container, an air sprayer, an airless sprayer, a hand pressurized sprayer such as a "Hudson" type garden sprayer (H.D. Hudson Mfg. Co., Hastings, Minn.) or a trigger sprayer, which facilitates ease of use and application.

Other features and advantages of the invention will be apparent from the following description of the preferred embodiments thereof, and from the claims.

DETAILED DESCRIPTION

The method of providing a fire barrier includes sealing an opening, e.g., a joint in a structure. The opening can be sealed by 1) coating a composition on the substrate(s) that defines the joint opening, as well as material within the opening, e.g., a fire retardant material (e.g., insulation or mineral wool), and 2) drying the composition to provide a seal that inhibits (more preferably prevents) the combustion products of fire from passing through the seal and the joint. The composition can be applied to all sides of the joint. The composition can be applied using a variety of techniques including, e.g., painting and spraying as described below.

The composition dries to form a film that, when tested at room temperature and after aging for 3 hours at 100° C., exhibits a tensile strength of from about 2.067 MPa (300 psi) to about 10.335 MPa (1500 psi) (more preferably from about 2.067 MPa (300 psi) to about 4.134 MPa (600 psi)), greater than about 600% elongation (preferably at least about 700% elongation, most preferably at least about 1000% elongation), a modulus of from about 1.378 MPa (200 psi) to about 4.134 MPa (600 psi) (more preferably from about 1.378 MPa (200 psi) to about 2.067 MPa (300 psi)), and a tensile toughness of greater than 1.13 Joules (10 in-lb) (preferably greater than about 2.26 Joules (20 in-lb), more preferably greater than about 3.39 Joules (30 in-lb), most preferably greater than about 4.52 Joules (40 in-lb)).

Upon drying, the composition also exhibits good adhesion to building substrates including, e.g., gypsum wallboard (i.e., sheetrock), concrete mortar, steel, fire retardant substrates, e.g., insulation and mineral wool, and other materials that define and fill joints in buildings. Preferred compositions exhibit a 90° peel strength, at break load, to concrete mortar of at least about 7 N/ln cm (4 lb/linear in), more preferably at least about 17.52 N/ln cm (10 lb/linear in.) when measured according to the 90° Peel Adhesion Test Method set forth below. The dried composition preferably does not flow when exposed to elevated temperatures, i.e., temperatures above room temperature.

The composition also forms a film that is sufficiently flexible to accommodate movement of a fire-rated assembly. Preferably the composition meets the wind sway (at 500 cycles at 10 cycles/min) and thermal (at 500 cycles at 1 cycle/min) categories that are set forth in ASTM E 1399.

The composition is formulated to maintain the integrity of a fire-rated assembly. The composition is also formulated such that it can maintain its fire barrier properties after experiencing repeated compression and extension cycling. The composition can also withstand the forces exerted by a water stream from a fire hose under fire conditions. Preferably the composition passes the Fire Test and the Hose Stream Test of Underwriters Laboratories, Inc. Standard for Safety UL 2079 Test for Fire Resistance of Building Joint Systems.

Preferred compositions are self-extinguishing, i.e., unable to sustain combustion without the addition of an external fuel source.

The liquid composition is water reducible and can be washed away with water without visible coagulating or stringing. Preferably the composition is infinitely miscible with water.

The liquid composition is formulated to have a viscosity suitable for the desired application method. Preferably the composition has a viscosity suitable for use in sprayers, e.g., airless sprayers, aerosol sprayers, hand pressurized sprayers and trigger sprayers. Preferably the composition has a viscosity of no greater than about 45 Pa*sec (45,000 cPs), more preferably from about 10 Pa*sec (10,000 cPs) to about 30 Pa*sec (30,000 cPs). For aerosol or hand pressurized sprayers, the viscosity is preferably from about 3 Pa*sec (3000 cPs) to about 5 Pa*sec (5,000 cPs), more preferably no greater than 4 Pa*sec (4,000 cPs).

The composition includes a latex that includes an elastomer, preferably a carboxylated elastomer. Examples of useful carboxylated elastomers include carboxylated polychloroprene (i.e., neoprene), carboxylated styrene butadiene rubber, carboxylated acrylonitrile, and combinations thereof.

Other useful elastomers include addition polymers derived from ethylenically unsaturated monomers, e.g., vinylacetate and acrylics, epoxy derived condensation polymers, urethanes, and carboxylated derivatives thereof, and combinations thereof.

The dried composition preferably includes carboxylated polychloroprene in an amount of from about 40% by weight to 100% by weight, more preferably from about 45 % by weight to about 80% by weight, most preferably from about 55% by weight to about 75% by weight.

The composition may include an antioxidant. Examples of useful antioxidants include metal oxides, e.g., zinc oxide and magnesium oxide, hindered bisphenols, and hindered amines. Preferably the amount of antioxidant present in the composition is from 0 to 5% by weight. Zinc oxide may also serve to provide ionic crosslinks among carboxylated polymer molecules in the dried film.

Other additives can be included in the composition including, e.g., antifoam agents, pigment, thickeners, antimicrobial agents, surfactants and combinations thereof.

The composition is preferably substantially free of volatile organic compounds.

The composition can be formulated with a propellant to provide an aerosol formulation capable of being dispensed from an aerosol container. The propellant and the components of the composition are selected to provide a stable system (preferably a stable dispersion) that is free of coagulation, stringing, or a combination thereof, when dispensed from an aerosol container. Examples of useful propellants include fluorocarbons, hydrocarbons and mixtures thereof. Suitable fluorocarbon propellants include, e.g., HFC-152a, HFC-134, HFC-134a, and mixtures thereof. Suitable hydrocarbon propellants include, e.g., propane, butane, n-butane, isobutane, pentane, isopentane, neopentane and combinations thereof.

The composition can be coated on a substrate using a variety of methods including, e.g., painting and spraying, e.g., pressurized aerosol spraying, air spraying, airless spraying, hand pressurized spraying and trigger spraying. The composition is also suitable for packaging in a number of containers including, e.g., pressurized aerosol containers, e.g., cans and canisters, and drums.

The invention will now be described by way of the following examples. All ratios and percentages are by weight unless otherwise indicated.

EXAMPLES

Test Procedures

Test procedures used in the examples include the following.

Tensile Properties

Tensile stress (psi), % Elongation (i.e., strain), and Modulus (psi), are determined according to ASTM D638 and ASTM D882. Toughness (in-lb) is calculated by integrating the area under the stress/strain curve.

A nominal 0.100 in. thick film is cast and dried at 22° C. for 1 week. A 2 in. dumbbell shaped sample having a 1 in. gage length is die cut from the dried film and tested at a strain rate of 12 in/minute.

90° Peel Adhesion

A 3 in. square steel tubing, 1.5 in. in cross section, is mated to a flat horizontal test substrate to provide a joint to be tested as a 90° peel. The test specimen is conditioned for seven days at room temperature (about 22° C.). Three test specimens are prepared each with a different substrate as follows: steel, concrete mortar and sheetrock.

The composition to be tested is painted on a 2 in.×3 in. area of the joint such that the composition covers a 1 in.×3 in. area on each side of the joint to provide a 3 linear (in) in. test area.

The test specimen is positioned in a horizontal plane and a normal load is applied to the test specimen at a strain rate of 12 in/minute. Peak load (lb/ln in.), extension at peak load (in.), break load (lb/ln in.), extension at break (in.) and failure mode are recorded.

Performance Tests

Fire Test No. 1

The sample composition is tested according to Underwriters Laboratories Inc., Standard for Safety UL 2079 Test for Fire Resistance of Building Joint Systems for "Head of Wall" joint systems. A joint is constructed according to UL Fire Resistance Directory System No. HW-D-0020. The joint is a 1 in. opening between a steel pan deck and gypsum wallboard assembly. A 1⅜ in. thick piece of mineral wool is compressed to fit in the 1 in. opening of the joint. The composition is sprayed over the mineral wool, overlapping onto the steel pan deck and the gypsum wallboard by ½ in. The coated joint is dried for five days at room temperature. The joint is then cycled for 500 cycles at 10 cycles/minute per ASTM E 1399. Each cycle includes extending the joint to achieve 25% elongation and compressing the joint to achieve 25% compression.

One side of the joint is then exposed to fire at 1700° F. for 1 hour while the joint is in the 25% extended state. If a flame does not pass through the joint and if the temperature of the unexposed side of the joint (the side opposite the exposed side) rises no greater than 325° F., the composition is deemed to have passed the test.

Fire Test No. 2

The sample composition is tested according to Underwriters Laboratories Inc., Standard for Safety UL 2079 Test for Fire Resistance of Building Joint Systems for Head of Wall joint systems. A joint is constructed according to UL Fire Resistance Directory System No. HW-D-0031. The joint is a 2 in. opening between a steel pan deck that has been coated with Monokote fire retardant material and gypsum wallboard assembly. A 2.5 in. thick piece of mineral wool is compressed to fit in the opening of the joint. The composition is sprayed over the mineral wool overlapping onto 2 in. of the Monokote and onto ½ in. of the gypsum wallboard.

The joint is dried for five days at room temperature and then cycled for 500 cycles at 10 cycles/minute. Each cycle includes extending the joint to achieve 25% elongation and compressing the joint to achieve 25% compression. One side of the joint is then exposed to fire at 1850° F. for 2 hours while the joint is in the 25% extended state.

If a flame does not pass through the joint and if the temperature of the unexposed side of the joint (the side opposite the exposed side) rises no greater than 325° F., the composition is deemed to have passed the test.

Fire Test No. 3

The sample is tested according to Underwriters Laboratories Inc., Standard for Safety UL 2079 Test for Fire Resistance of Building Joint Systems for Floor to Floor joint systems. A joint is constructed according to UL Fire Resistance Directory System No. FF-D-0002. The joint is a 2 in. opening between two 3 ft×6 ft×4.5 in. concrete mortar slabs. A 4 in. thick piece of mineral wool is compressed to fit in the opening of the joint. The composition is sprayed over the mineral wool overlapping ½ in. of each of the concrete mortar slabs.

The sprayed composition is dried for at least 5 days at room temperature. The joint is cycled for 500 cycles at 10 cycles/min per ASTM E 1399. Each cycle includes extending the joint to achieve 25% elongation and compressing the joint to achieve 25% compression. After cycling, one side of the joint is exposed to fire at 1850° F. for 2 hours while the joint is in the 25% extended state.

If a flame does not pass through the joint and if the temperature of the unexposed side of the joint (the side opposite the exposed side) rises no greater than 325° F., the composition is deemed to have passed the test.

Hose Stream Test

The joints tested according to Fire Test Nos. 1 and 2 are immediately tested according to Underwriters Laboratories Inc., Standard for Safety UL 2079 Test for Fire Resistance of Building Joint Systems Hose Stream Test for Head of Wall and Floor to Floor joint systems, respectively.

If water does not pass through the joint, the composition is deemed to have passed the test.

Sample Preparation

EXAMPLE 1

55 g AquaStik 1120 Carboxylated Neoprene latex (DuPont Dow Elastomers, Akron, Ohio), 45 g Butofan NS278 carboxylated styrene butadiene rubber (BASF, Germany), 0.2 g Foamaster 111 antifoam (Henkel Corp. Ambler, Pa.), 0.6 g 60% zinc oxide dispersion (R.T. Vanderbilt, Akron, Ohio), 0.2 g Sup-R-Conc L 10-6C-41-L401 green pigment dispersion (Hilton-Davis, Cincinnati, Ohio) were mixed by shaking. A premix of 0.35 g Cellosize QP-1500 hydroxyethyl cellulose thickener (Union Carbide, Chicago, Ill.) and 1.95 g deionized water were combined with the above mixture to form a sprayable composition.

The composition had a viscosity of 30 Pa*sec (30,000 cPs) as measured using a #4 spindle at 12 rpms using a Brookfield LVT viscometer.

EXAMPLE 2

A composition was prepared according to Example 1 with the exception that the hydroxyethyl cellulose premix was omitted. The composition had a viscosity of 3.8 Pa*sec (3,800 cPs).

EXAMPLE 3

A composition was prepared according to Example 1, with the exception that the composition included 75 g neoprene latex and 25 g carboxylated styrene butadiene rubber latex.

EXAMPLE 4

A composition was prepared according to Example 1 with the exception that the composition included 100 g neoprene latex and 0 g carboxylated styrene butadiene rubber latex.

EXAMPLE 5

A composition was prepared according to Example 1 with the exception that the composition included 0.4 g of zinc oxide dispersion.

EXAMPLE 6

A composition was prepared according to Example 1 with the exception that the composition included 1.3 g of zinc oxide dispersion.

EXAMPLE 7

A composition was prepared according to Example 1 with the exception that the composition included 2.6 g of zinc oxide dispersion and 0.15 g defoamer (SE 24, Wacker, Adrian, Mich.).

5 g of the composition of Example 7 was diluted with 95 g water and shaken for 30 minutes. No coagulation or stringing was observed.

EXAMPLE 8

A composition was prepared according to Example 1 with the exception that the composition included 65 g neoprene, 35 g carboxylated styrene butadiene rubber, 2.6 g zinc oxide dispersion and 0.07 defoamer (SE 24, Wacker).

The compositions of Examples 1–8 were tested according to the Tensile Properties test method. The results are reported in Table 1.

TABLE 1

| Example (Neoprene/S BR/ZnO) | Tensile Stress (psi) | (MPa) | Strain (% elongation) | Modulus (psi) | (MPa) | Toughness (in-lb.) | (Joules) |
|---|---|---|---|---|---|---|---|
| 1 (55/45/0.6) | 647 | 4.45 | 967 | 255 | 1.76 | 28 | 3.16 |
| 2 (55/45/0.6) | 636 | 4.38 | 846 | 261 | 1.80 | 27 | 3.05 |
| 3 (75/25/0.6) | 649 | 4.47 | 1066 | 225 | 1.55 | 29 | 3.27 |
| 4 (100/0/0.6) | 600 | 4.13 | 1009 | 251 | 1.73 | 22 | 2.49 |
| 5 (55/45/0.4) | 238 | 1.64 | 858 | 107 | 0.74 | 14 | 1.58 |
| 6 (55/45/1.3) | 365 | 2.51 | 862 | 135 | 0.93 | 16 | 1.81 |
| 7 (55/45/2.6) | 500 | 3.44 | 699 | 263 | 1.81 | 18 | 2.03 |
| 8 (65/35/2.6) | 489 | 3.37 | 706 | 230 | 1.58 | 21 | 2.37 |

The composition of Example 7 was tested according to the 90° Peel Adhesion Test.

The results are reported in Table 2.

TABLE 2

|  | Adhesion to Steel | Adhesion to concrete mortar | Adhesion to Sheetrock |
|---|---|---|---|
| Peak load (lb/ln in) | 34 | 76 | Paper split at 14–14.6 lbs |
| Extension at peak load (in) | 0.5 | 0.05 | NA |
| Break load (lb/ln in) | NA | 10.4 | NA |
| Extension at break (in) | 1.0 | 3.5 | NA |
| Failure | Cohesive-one side to 0.5 in, then adhesive loss to failure | Adhesive loss to metal | NA |

NA = not applicable

The composition of Example 1 was tested according to UL Performance Tests. The results are reported in Table 3.

TABLE 3

| Example | Fire Test 1 | Fire Test 2 | Fire Test 3 | Hose Stream Test Fire Test 1 | Hose Stream Test Fire Test 2 |
|---|---|---|---|---|---|
| 1 | Pass | Pass | Pass | Pass | Pass |

EXAMPLE 9

The composition of Example 1 was then placed in an airless sprayer and then sprayed onto a substrate from a distance of 8 in.

The composition provided a fine spray without coagulation or stringing and without clogging the spray gun orifice.

EXAMPLE 10

An aluminum aerosol can was filled with 425 g of the composition of Example 2. The can was then purged with Dymel 152 propellant (DuPont) to remove the air. The can was then sealed and charged with 175 g of Dymel 152 propellant. The can was shaken to emulsify the formulation.

The formulation was then sprayed on a substrate from a distance of 8 in. and the spray pattern was observed. No stringing or coagulation occurred.

A second sample of the same formulation was tested after aging for 45 days at 120° F. and tested as described above. The same spray pattern was observed and no stringing or coagulation occurred.

Other embodiments are within the following claims. For example, although the method has been described as useful for sealing joints, it is also well suited to sealing a variety of openings in structures.

What is claimed is:

1. A device capable of spraying a composition, said device comprising:
   a chamber; and
   a composition comprising an elastomer disposed in said chamber, said composition being substantially free of volatile organic compounds and, when dry, exhibiting a tensile strength of from about 300 psi to about 1500 psi, at least about 600% elongation, a modulus of from about 200 psi to about 600 psi, and a tensile toughness of greater than 10 in-lb.

2. An aerosol container comprising the device of claim 1, and a propellant.

3. The aerosol container of claim 2, wherein said propellant comprises a fluorocarbon.

4. The aerosol container of claim 2, wherein said composition is capable of passing at least one test selected from the group consisting of Fire Test No. 1, Fire Test No. 2 and Fire Test No. 3, when installed in the fire rated construction of the test.

5. The aerosol container of claim 2, wherein said elastomer is selected from the group consisting of polychloroprene, styrene butadiene rubber and mixtures thereof.

6. The aerosol container of claim 2, wherein said composition is a latex composition.

7. The device of claim 1, wherein said composition is capable of passing at least one test selected from the group consisting of Fire Test No. 1, Fire Test No. 2 and Fire Test No. 3, when installed in the fire rated construction of the test.

8. The device of claim 1, wherein said elastomer is selected from the group consisting of polychloroprene, styrene butadiene rubber and mixtures thereof.

9. The device of claim 1, wherein said composition is a latex composition.

10. A device capable of spraying a composition, said device comprising:
a chamber; and
a composition comprising a carboxylated elastomer disposed in said chamber, said composition being water reducible and, when dry, exhibiting a toughness of at least about 20 in-lb.

11. An aerosol container comprising the device of claim 10, and a propellant.

12. The aerosol container of claim 11, wherein said composition is capable of passing at least one test selected from the group consisting of Fire Test No. 1, Fire Test No. 2 and Fire Test No. 3, when installed in the fire rated construction of the test.

13. The aerosol container of claim 11, wherein said elastomer is selected from the group consisting of polychloroprene, styrene butadiene rubber and mixtures thereof.

14. The aerosol container of claim 11, wherein said composition is a latex composition.

15. The device of claim 10, wherein said composition, when dry, exhibits at least about 600% elongation.

16. The device of claim 10, wherein said composition, when dry, exhibits a modulus of from about 200 psi to about 300 psi.

17. The device of claim 10, wherein said composition, when dry, exhibits a tensile strength of from about 300 psi to about 1500 psi.

18. The device of claim 10, wherein said composition, when dry, exhibits a toughness of at least about 30 in-lb.

19. The device of claim 10, wherein said composition is substantially free of volatile organic compounds.

20. The device of claim 10, wherein said elastomer is selected from the group consisting of polychloropene, styrene butadiene rubber and mixtures thereof.

21. The device of claim 10, wherein said composition is capable of passing at least one test selected from the group consisting of Fire Test No. 1, Fire Test No. 2 and Fire Test No. 3, when installed in the fire rated construction of the test.

22. The device of claim 10, wherein said composition is a latex composition.

23. A device capable of spraying a composition, said device comprising:
a chamber; and
a composition comprising a carboxylated elastomer disposed in said chamber, said composition being water reducible and, when dry, exhibiting a modulus of from about 200 psi to about 600 psi and a toughness of greater than 10 in-lb.

24. An aerosol container comprising the device of claim 23 and a propellant.

25. The aerosol container of claim 24, wherein said composition is capable of passing at least one test selected from the group consisting of Fire Test No. 1, Fire Test No. 2 and Fire Test No. 3, when installed in the fire rated construction of the test.

26. The aerosol container of claim 24, wherein said elastomer is selected from the group consisting of polychloropene, styrene butadiene rubber and mixtures thereof.

27. The aerosol container of claim 24, wherein said composition is a latex composition.

28. The device of claim 23, wherein said composition, when dry, exhibits a modulus of from about 200 psi to about 300 psi.

29. The device of claim 23, wherein said elastamer is selected from the group consisting of polychloropene, styrene butadiene rubber and mixtures thereof.

30. The device of claim 23, wherein said composition is capable of passing at least one test selected from the group consisting of Fire Test No. 1, Fire Test No. 2 and Fire Test No. 3, when installed in the fire rated construction of the test.

31. The device of claim 23, wherein said composition is a latex composition.

32. The device of claim 35, wherein said composition, when dry, exhibits at least about 600% elongation.

33. The device of claim 35, wherein said composition, when dry, exhibits a modulus of from about 200 psi to about 600 psi.

34. The device of claim 35, wherein said composition is capable of passing at least one test selected from the group consisting of Fire Test No. 1, Fire Test No. 2 and Fire Test No. 3, when installed in the fire rated construction of the test.

35. A device capable of spraying a composition, said device comprising:
a chamber; and
a composition comprising a carboxylated elastomer disposed in said chamber said composition being water reducible and, when dry, exhibiting a tensile strength of from about 300 psi to about 1500 psi and a toughness of greater than 10 in-lb.

36. An aerosol container comprising the device of claim 35, and a propellant.

37. The aerosol container of claim 36, wherein said composition is capable of passing at least one test selected from the group consisting of Fire Test No. 1, Fire Test No. 2 and Fire Test No. 3, when installed in the fire rated construction of the test.

38. The aerosol container of claim 36, wherein said elastomer is selected from the group consisting of polychloropene, styrene butadiene rubber and mixtures thereof.

39. The aerosol container of claim 36, wherein said composition is a latex composition.

40. The device of claim 35, wherein said elastomer is selected from the group consisting of polychloropene, styrene butadiene rubber and mixtures thereof.

41. The device of claim 35, wherein said composition is a latex composition.

* * * * *